United States Patent
Boodaei et al.

(10) Patent No.: US 11,388,167 B2
(45) Date of Patent: Jul. 12, 2022

(54) CONTEXTUAL SCORING OF AUTHENTICATORS

(71) Applicants: Michael Boodaei, Givatayim (IL); Eldan Ben-Haim, Kiryat Ono (IL); Dima Polsky, Tel-Aviv (IL)

(72) Inventors: Michael Boodaei, Givatayim (IL); Eldan Ben-Haim, Kiryat Ono (IL); Dima Polsky, Tel-Aviv (IL)

(73) Assignee: Transmit Security Ltd., Tel-Aviv (IL)

(*) Notice: Subject to any disclaimer, the term of this patent is extended or adjusted under 35 U.S.C. 154(b) by 169 days.

(21) Appl. No.: 16/699,779

(22) Filed: Dec. 2, 2019

(65) Prior Publication Data
US 2021/0168148 A1 Jun. 3, 2021

(51) Int. Cl.
*H04L 9/40* (2022.01)
*G06F 21/31* (2013.01)
*G06F 21/40* (2013.01)

(52) U.S. Cl.
CPC .......... *H04L 63/102* (2013.01); *G06F 21/316* (2013.01); *H04L 63/0838* (2013.01); *G06F 21/31* (2013.01); *G06F 21/40* (2013.01); *H04L 63/107* (2013.01)

(58) Field of Classification Search
CPC . H04L 63/102; H04L 63/107; H04L 63/0838; H04L 9/40; G06F 21/31; G06F 21/316; G06F 21/40
See application file for complete search history.

(56) References Cited

U.S. PATENT DOCUMENTS

| 2011/0314549 | A1* | 12/2011 | Song | G06F 21/31 726/25 |
| 2016/0182503 | A1* | 6/2016 | Cheng | H04W 12/082 726/7 |
| 2017/0070510 | A1* | 3/2017 | Ramalingam | H04L 63/08 |
| 2017/0227995 | A1* | 8/2017 | Lee | G06N 20/00 |
| 2019/0140833 | A1* | 5/2019 | Grajek | G06K 9/6278 |
| 2019/0158491 | A1* | 5/2019 | Burmester | H04L 63/105 |
| 2021/0144134 | A1* | 5/2021 | Kurylko | H04L 63/102 |

* cited by examiner

*Primary Examiner* — Jayesh M Jhaveri

(57) ABSTRACT

Disclosed herein are methods, systems and device for estimating an identity confidence level for a user requesting access to a secure resource, comprising: initiating an authentication session to authenticate the user using a client device to access the secure resource, computing a cumulative identity confidence score in a plurality of iterations and successfully authenticating the user in case the cumulative identity confidence score exceeds a threshold predefined for the secure resource. Each iteration comprising initiating a respective one of a plurality of authentication methods selected according to contextual authentication attribute(s) identified for the authentications session, computing an identity confidence score for the user in case of successful authentication, adjusting the confidence score according to the contextual authentication attribute(s), updating the cumulative identity confidence score according to the adjusted identity confidence score and initiating another iteration in case the cumulative identity confidence score does not exceed the predefined threshold.

16 Claims, 2 Drawing Sheets

CONTEXTUAL SCORING OF AUTHENTICATORS

FIELD AND BACKGROUND OF THE INVENTION

The present invention, in some embodiments thereof, relates to authenticating a user requesting to access a secure service, and, more specifically, but not exclusively, to authenticating a user requesting to access a secure service based on contextual authentication session attributes identified for the authentication session.

Access to secure online and/or offline resources is often subject to user authentication in which the user is required to provide evidence to prove his identity. Reliable authentication may be a major concern when accessing secure online services, secure systems, secure platforms and/or the like such as, for example, online finance services (e.g. banking services, credit/debit card services, etc.), remote access applications, entertainment content streaming services, social networks and/or the like.

User authentication may be carried out by a plurality of methods, techniques and/or implementations employing various paradigms, for example, knowledge based authentication, item possession and/or association authentication and/or the like such as, for example, static password authentication, dynamic One Time Password (OTP) authentication, biometric authentication, key authentication and/or the like and in some cases multiple such authentication methods may be further combined.

Each of these methodologies and implementations may impose a certain amount of effort on the user to authenticate himself while ensuring a certain level of confidence in the user's identity when successfully authenticated.

SUMMARY OF THE INVENTION

According to a first aspect of the present invention there is provided a computer implemented method of estimating an identity confidence level for a user requesting access to a secure resource based on contextual information, comprising:
  Initiating an authentication session in response to an authentication request for authenticating the user using a client device to access the secure resource.
  Computing a cumulative identity confidence score in a plurality of iterations each comprising:
    Identifying automatically one or more of a plurality of contextual authentication attributes for the authentication session.
    Initiating a respective one of a plurality of authentication methods selected according to one or more of the contextual authentication attributes.
    Computing a respective identity confidence score for the user in case of successful authentication.
    Adjusting the respective identity confidence score according to one or more of the plurality of contextual authentication attributes.
    Updating the cumulative identity confidence score according to the respective adjusted identity confidence score.
    Initiating another iteration in case the cumulative identity confidence score does not exceed a threshold predefined for the secure resource.
  Outputting a successful authentication indication in case the cumulative identity confidence score exceeds the predefined threshold.

According to a second aspect of the present invention there is provided an authentication system for estimating an identity confidence level for a user requesting access to a secure resource based on contextual information, comprising a program store storing a code and one or more processors of an authentication system coupled to the program store for executing the stored code. The code comprising:
  Code instructions to initiate an authentication session in response to an authentication request for authenticating the user using a client device to access the secure resource.
  Code instructions to compute a cumulative identity confidence score in a plurality of iterations each comprising:
    Identifying automatically one or more of a plurality of contextual authentication attributes for the authentication session.
    Initiating a respective one of a plurality of authentication methods selected according to one or more of the contextual authentication attributes.
    Computing a respective identity confidence score for the user in case of successful authentication.
    Adjusting the respective identity confidence score according to one or more of the plurality of contextual authentication attributes.
    Updating the cumulative identity confidence score according to the respective adjusted identity confidence score.
    Initiating another iteration in case the cumulative identity confidence score does not exceed a threshold predefined for the secure resource.
  Code instructions to Output a successful authentication indication in case the cumulative identity confidence score exceeds the predefined threshold.

According to a third aspect of the present invention there is provided a computer program product for estimating an identity confidence level for a user requesting access to a secure resource based on contextual information, comprising:
  A non-transitory computer readable storage medium.
  First program instructions for initiating an authentication session in response to an authentication request for authenticating the user using a client device to access the secure resource.
  Second program instructions for computing a cumulative identity confidence score in a plurality of iterations each comprising:
    Identifying automatically one or more of a plurality of contextual authentication attributes for the authentication session.
    Initiating a respective one of a plurality of authentication methods selected according to one or more of the contextual authentication attributes.
    Computing a respective identity confidence score for the user in case of successful authentication.
    Adjusting the respective identity confidence score according to one or more of the plurality of contextual authentication attributes.
    Updating the cumulative identity confidence score according to the respective adjusted identity confidence score.
    Initiating another iteration in case the cumulative identity confidence score does not exceed a threshold predefined for the secure resource.
  Third program instructions for outputting a successful authentication indication in case the cumulative identity confidence score exceeds the predefined threshold.

Wherein the first, second and third program instructions are executed by one or more processors of an authentication system from the non-transitory computer readable storage medium.

In an optional implementation form of the first, second and/or third aspects, the cumulative identity confidence score is adjusted according to one or more scoring rules defining a mutual scoring relation between at least some of the authentication methods initiated in the authentication session.

In an optional implementation form of the first, second and/or third aspects, the identity confidence score is adjusted according to a weight predefined for one or more of the contextual authentication attributes.

In a further implementation form of the first, second and/or third aspects, the authentication session is conducted by a local authentication system deployed in the client device.

In a further implementation form of the first, second and/or third aspects, the authentication session is conducted at least partially by a remote authentication system accessible to the client device via one or more networks.

In a further implementation form of the first, second and/or third aspects, the plurality of authentication methods comprising at least some of a group consisting of: a static password based authentication, a One Time Password (OTP) based authentication, a biometric based authentication and a proof of possession based authentication.

In a further implementation form of the first, second and/or third aspects, each of the plurality of contextual authentication attributes relates to the user, the client device and/or one or more of the authentication methods.

In a further implementation form of the first, second and/or third aspects, one or more of the contextual authentication attributes relating to the user are derived from historical authentication information collected during one or more previous authentication sessions conducted for the user.

In a further implementation form of the first, second and/or third aspects, the contextual authentication attributes derived from the historical authentication information comprises, for example, one or more access patterns of the user to the secure resource, success of one or more previous authentication sessions, failure of one or more previous authentication sessions and/or the like. One or more of the access patterns relates to an access timing, an access geolocation and/or the like.

In a further implementation form of the first, second and/or third aspects, the contextual authentication attributes relating to the client device include, for example, a type of the client device, association of the client device with the user, one or more operational parameters of the client device and/or the like.

In a further implementation form of the first, second and/or third aspects, the contextual authentication attributes relating to one or more of the authentication method includes historical information collected for the respective authentication method, activity information documenting past interaction of the user with the respective authentication method, one or more operational parameters of the respective authentication method and/or the like.

In a further implementation form of the first, second and/or third aspects, the threshold of the secure resource is defined according to one or more attributes relating to the secure resource which reflects a criticality of the secure resource, a potential damage resulting from breach of the secure resource and/or the like. One or more of the secure resource attributes include a type of the secure resource, a sensitivity level predefined for the secure resource, a security level predefined for the secure resource, a privacy level predefined for the secure resource and/or the like.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
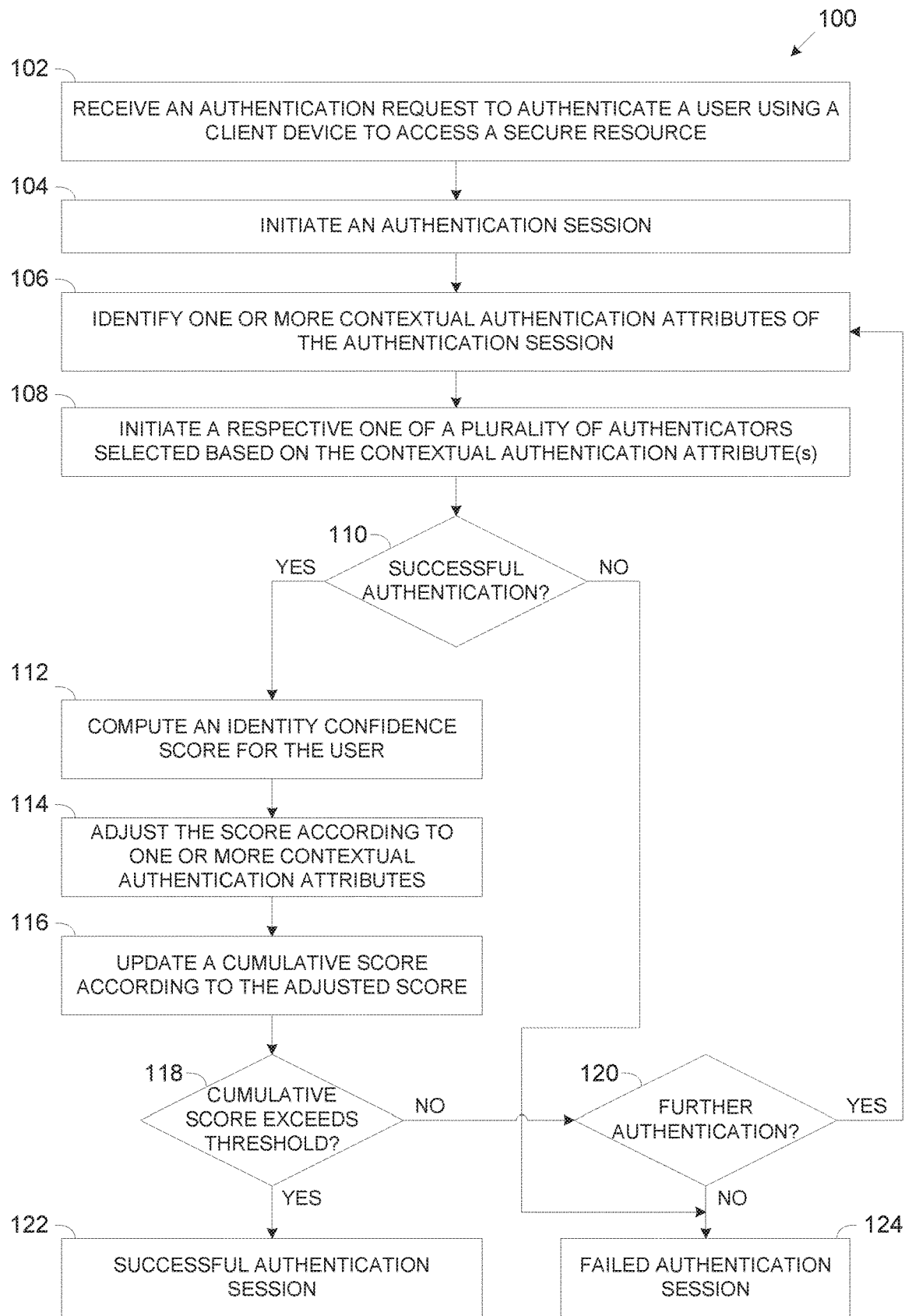
FIG. 1 is a flowchart of an exemplary process of authenticating a user requesting to access a secure service based on authentication session attributes identified for the authentication session, according to some embodiments of the present invention.

DESCRIPTION OF SPECIFIC EMBODIMENTS
OF THE INVENTION

The present invention, in some embodiments thereof, relates to authenticating a user requesting to access a secure service, and, more specifically, but not exclusively, to authenticating a user requesting to access a secure service based on contextual authentication session attributes identified for the authentication session.

According to some embodiments of the present invention, there are provided methods, systems, devices and computer software programs for authenticating users using client devices to access secure resources and increasing a confidence level in the users' identity based on contextual authentication according to one or more contextual authentication attributes identified specifically for each authentication session.

The secure resources, for example, a secure service, a secure application, a secure platform, a secure record and/or the like may include local secure resources provided by the client devices (e.g. Smartphone, tablet, smart watch, desktop, laptop, proprietary client device, etc.) used by the users and/or remote secure resources accessible to the client devices via one or more networks. Such secure resources may include, for example, secure login, access to records (files, database, etc.), online financial services (e.g. banking service, credit/debit card service, etc.), remote access applications, entertainment content streaming services, social networks and/or the like.

The contextual authentication may be based on an iterative authentication session comprising a plurality of authentication iterations where in each iteration a respective one of a plurality of authentication methods (authenticators) may be employed for further authenticating the user.

Different authentication methods, for example, static password based authenticators, One Time Password (OTP) based authenticators, biometric based authenticators and proof of possession-based authenticators and/or the like may each require a different amount of effort from the user to authenticate himself while ensuring a different confidence level in the authenticated identity of the user. Such authentication effort may be reflected by the degree to which the authentication session is tedious, time consuming and/or effort consuming for the user.

The authentication system may therefore dynamically control the authentication session, for example, select the authentication methods and/or define a certain identity confidence threshold for the secure resource(s) requested by the user according to the contextual authentication attribute(s) and/or secure resource(s)' attributes identified in real-time for the specific authentication session. In particular, the authentication system may dynamically control the authentication session in real-time to balance between the burden laid on the user, i.e. the effort required from the user to authenticate himself and the confidence level required for sufficiently verifying the identity of the user. Applying the iterative authentication session, the authentication system may thus accumulate confidence in the identity of the user through the plurality of authentication methods until reaching or exceeding a certain identity confidence threshold defined for the secure resource(s) requested by the user.

The identity confidence threshold defined for the secure resource requested (accessed) by the user may reflect the criticality of the secure resource and/or the potential damage which may result from breach of the secure resource. The threshold may be therefore defined according to one or more attributes of the secure resource(s) the user requests to access, for example, a type of the secure resource, a predefined sensitivity level, a predefined security level, a predefined privacy level and/or the like. The threshold defined for the secure resource(s) may translate to the number of authentication iterations required for the authentication system to accumulate sufficient confidence in the identity of the user.

In each authentication iteration, the authentication system may initiate a respective one of the authenticators, optionally selected by the user, and may compute a respective identity confidence score for the currently used authenticator, for example, an identity confidence score predefined for the selected authentication method. In case the user fails to successfully authenticate, the authentication system may fail the authentication session and indicate that the user should be denied access to the requested secure resource. Optionally, the authentication system may ignore the failed authentication iteration and attempt to authenticate the user via one or more successful authentication iterations.

In each successful authentication iteration in which the user is successfully authenticated and assigned the respective identity confidence score, the authentication system may further adjust the respective identity confidence score according to one or more contextual authentication attributes identified for the authentication session in general and/or for the current authentication iteration. The authentication system may apply one or more scoring rules to adjust the identity confidence score according to the contextual authentication attribute(s). One or more of the scoring rules may be predefined by one or more users, for example, an expert, an administrator, an operator and/or the like. Optionally, the authentication system may automatically define, adjust and/or update one or more of the scoring rules according to analysis of a plurality of authentication sessions conducted for a plurality of users requesting to access the secure resources.

The contextual authentication attributes which may be highly indicative of a risk for a compromised authentication session may relate to one or more aspects of the authentication session, for example, the accessing user including information relating to one or more previous authentication sessions, the associated client device, the authentication methods and measures, their availability and/or the like.

The contextual authentication attributes relating to the user may be derived from historical authentication information related to and/or collected during one or more previous authentication sessions conducted for the user, which may reflect risk, probability and/or concern that the user may be an imposter impersonating as a legitimate user in attempt to access the secure resource. Such contextual authentication attributes may include, for example, typical access patterns (e.g. time, geolocation) recorded for the user, success/failure of previous authentication sessions and/or the like.

The contextual authentication attributes relating to the client device may include, for example, a type of the client device, association of the user with the client device, operational parameters of the client device and/or the like.

The contextual authentication attributes relating to the authentication methods (authenticators) may include, for example, historical information collected for the authenticator(s), activity information documenting past interaction of the user with the authenticator(s), operational parameters of the authenticator(s) and/or the like.

During each successful authentication iteration, the authentication system may update the cumulative identity confidence score according to the respective identity confidence score computed in the current iteration.

The authentication system may further adjust the cumulative identity confidence score according to one or more of the scoring rules to compensate for interdependence between the authenticator initiated in the current iteration and one or more authenticators initiated in previous iterations. For example, in case multiple authenticators are based on something that the user knows (e.g. password, answer to security question, etc.), the authentication system may adjust the cumulative identity confidence score accordingly. In another example, in case multiple authenticators are based on something that the user has (e.g. a physical key, a client device, used for OTP, etc.), the authentication system may adjust the cumulative identity confidence score accordingly.

The authentication system may then compare the cumulative identity confidence score against a threshold value predefined for the requested secure resource. In case the cumulative identity confidence score exceeds the predefined threshold, the authentication system may determine that the user is authenticated with a sufficient level of confidence and may indicate the user may be granted access to the requested secure resource. However, in case the cumulative identity confidence score does not exceed the predefined threshold, the authentication system may initiate another authentication iteration after which the updated cumulative identity confidence score is compared again to the predefined threshold. The iterative authentication process may repeat until the maximal number of iterations is reached.

In case the maximum number of authentication iterations is reached and the cumulative identity confidence score does not exceed the predefined threshold, the authentication system may fail the authentication session and determine that the user is not authenticated with a sufficient level of confidence and should be denied access to the requested secure resource.

The contextual authentication may present major benefits and advantages over currently existing methods and systems for user authentication.

First, while the existing authentication systems may validate the identity of the user, such systems may ignore some contextual information, which may affect the confidence in the genuine identity of the user even if successfully authenticated. For example, the existing systems may determine that a user who successfully authenticated using a password (secret) based authenticator is a legitimate user and may grant him access to the secure resource. However, in case the password used by the user was very recently reset it may be indicative of an imposter who has reset the password and impersonates as the user to gain access to the secure resource. The contextual authentication system on the other hand may further evaluate the identity of the user based on the fact that the password was recently reset and may require further authentication and/or deny the user access to the secure resource.

Moreover, dynamically controlling and adjusting the iterative authentication session in real-time, for example, selecting certain authenticators and/or setting the threshold for the requested secure resource(s), according to the contextual authentication attributes identified specifically for the current authentication may serve to dynamically balance, for each authentication session specifically and/or independently, between the effort required from the user to authenticate himself and the confidence level required for sufficiently verifying the identity of the user.

Furthermore, even if some of the existing authentication methods apply multiple authenticators for authenticating the user, such authentication methods may fail to compensate for potential mutual dependence between the authenticators. The contextual authentication on the other hand may identify such interdependencies between multiple authenticators applied to authenticate the user and may adjust the confidence in the user's identity accordingly thus overcoming the limitations of the existing methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of authenticating a user requesting to access a secure service based on authentication session attributes identified for the authentication session, according to some embodiments of the present invention. An exemplary process 100 may be executed by an authentication system to initiate an authentication session to authenticate users using associated client devices to access one or more secure services.

The authentication of the users requesting access to the secure resource(s) is based on identifying one or more contextual authentication attributes for the authentication session, which may be indicative of a risk for a compromised authentication session. The contextual authentication attributes may relate to one or more aspects of the authentication session, for example, the accessing user including information relating to one or more previous authentication sessions, the associated client device, the accessed secure resource(s), available authentication methods and measures and/or the like.

The authentication system may therefore dynamically control, alter and/or adjust the authentication session according to the identified contextual authentication attribute(s) to increase confidence and certainty that the user is genuinely who he claims to be. For example, the authentication system may select authenticators (authentication methods and/or procedures) according to the contextual authentication attribute(s), adjust a confidence score computed for the user based on the contextual authentication attribute(s), aggregate confidence scores computed for the user using a plurality of authenticators and/or the like. The authentication system may further evaluate the overall confidence score computed for the user with respect to the secure resource(s) accessed by the user.

Figure 2:
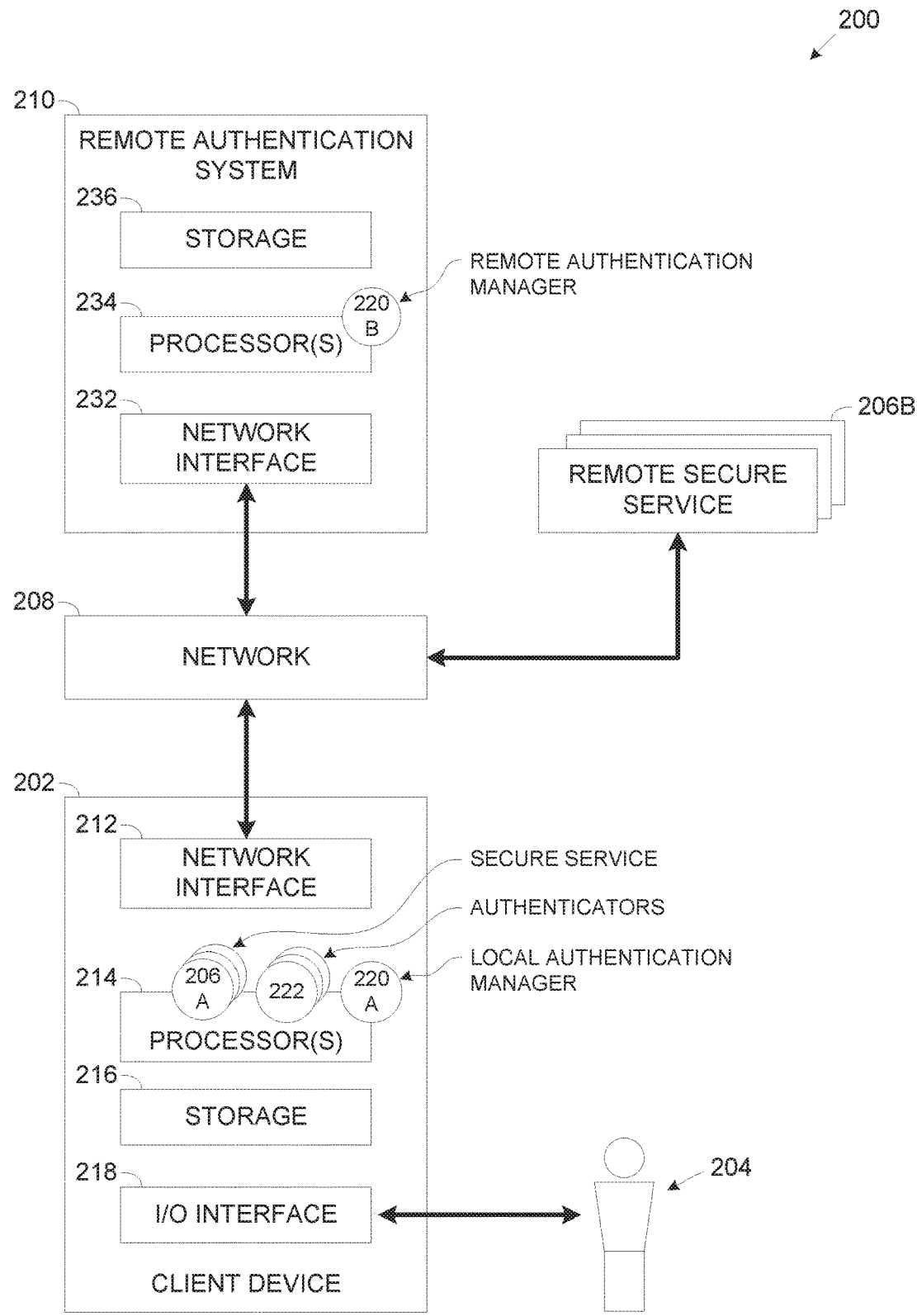
FIG. 2 is a schematic illustration of an exemplary system for authenticating a user requesting to access a secure service based on authentication session attributes identified for the authentication session, according to some embodiments of the present invention.

Reference is also made to FIG. 2, which is a schematic illustration of an exemplary system for authenticating a user requesting to access a secure service based on authentication session attributes identified for the authentication session, according to some embodiments of the present invention. As seen in an exemplary 200, a user 204 may use a client device 202, for example, a Smartphone, a tablet, a smart watch, a desktop, a laptop, a proprietary client device and/or the like to access one or more secure services 206.

In order to ensure their security, safety and/or privacy, access to the secure service(s) 206 may be restricted such that the user 204 needs to first be authenticated to verify his identity and ensure he is permitted to access the secure service(s) 206 before granted access to the secure service(s) 206.

The secure resources 206 may include one or more local secure resources 206A provided by the client device 202, for example, accessing the client device 202 (e.g. secure login) and/or accessing one or more secure services, applications and/or tools executed by the client device 202.

The secure resources 260 may further include one or more remote secure resources 206B accessible to the client device 202 via a network 208, for example, a secure service, a secure system, a secure platform and/or the like such as, for example, an online finance service (e.g. a banking service, a credit/debit card service, etc.), a remote access system, an entertainment content streaming service and/or the like. The remote secure resources 206B may be utilized by, for example, a server, a computing node, a cluster of computing nodes, a cloud service, cloud platform, cloud application and/or the like accessible to the client device 202 via the network 208. The user 204 may typically use a locally executed application to access the remote secure resources 206B, for example, a web browser, a local agent, an access utility and/or the like executed by the client device 202.

The network 208 through which the client device 202 may communicate with the remote secure resource(s) 206B may include one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

The secure service(s) 206, either the local secure resource(s) 206A and/or the remote secure resource(s) 206B) may be associated with an authentication system configured to initiate an authentication session in response to an access request of the user 204 to the secure resource(s)

206 and verify the identity of the user 204 before granting him access to the secure resource(s) 206.

The authentication system may be deployed in the client device 202 such that the client device 202 executed, manages and controls the authentications session. Optionally, the authentication session and/or part thereof is conducted by a remote authentication system 210. For example, the client device 202 may execute a local application, for example, a web browser, a local agent, an access utility and/or the like executed by the client device 202 for communicating with the remote authentication system 210 via the network 208.

The client device 202 may comprise a processor(s) 214 for executing the authentication process 100 and/or part thereof to authenticate the user 204, a storage 216 for storing data and/or code (program store) and an Input/Output (I/O) interface 218 for interacting with the user 204.

The processor(s) 214, homogenous or heterogeneous, may include one or more processing nodes arranged for parallel processing, as clusters and/or as one or more multi core processor(s). The storage 216 may include one or more non-transitory persistent storage devices, for example, a Read Only Memory (ROM), a Flash array, a hard drive and/or the like. The storage 216 may also include one or more volatile devices, for example, a Random Access Memory (RAM) component, a cache and/or the like.

The processor(s) 214 may execute one or more software modules such as, for example, a process, a script, an application, an agent, a utility, a tool and/or the like each comprising a plurality of program instructions stored in a non-transitory medium (program store) such as the storage 216 and executed by one or more processors such as the processor(s) 214. For example, the processor(s) 214 may execute one or more software modules to provide one or more of the local secure resources 206A, for example, a client device 202 access application (e.g. secure login), a secure service, a secure application, a secure tool and/or the like. In another example, the processor(s) 214 may execute one or more software modules, for example, a web browser, a local agent, an access utility and/or the like for accessing one or more of the remote secure resources 206B.

The processor(s) 214 may also execute one or more authentication software modules, specifically, authenticators 222 for authenticating the user 204 before granting him access to the secure resource(s) 206. The authenticators 222 may employ one or more authentication methods and/or modalities as known in the art.

For example, one or more of the authenticators 222 may be password and/or knowledge based authenticates which may require the user 204 to authenticate by providing a predefined static secret, which is known only to the user 204. For example, one or more of the authenticators 222 may require the user 204 to provide a password, a code, a key and/or the like. In another example, one or more of the authenticators 222 may require the user 204 to connect to the client device 202 one or more attachable devices storing the predefined static secret in order to transfer the stored secret and/or a derivative of the secret to the authenticator 222. In another example, one or more of the authenticators 222 may require the user 204 to provide predefined information, for example, answers to one or more security questions, which are predefined and stored for the user 204.

In another example, one or more of the authenticators 222 may be based on proof of possession authentication in which the user 204 may authenticate by presenting an object, which is in his sole possession. For example, one or more of the authenticators 222 may require the user 204 to attach to the client device 202 a key allocated solely to the user 204. In another example, one or more of the authenticators 222 may require the user 204 to present a printed QR code encoding a private key solely owned by the user 204, which may be scanned by a camera of the client device 202.

In another example, one or more of the authenticators 222 may be based on biometric authentication in which the user 204 may be authenticated biometrically. For example, one or more of the authenticators 222 may compare a fingerprint of the user 204 captured by a fingerprint reader supported by the I/O interface 218 with a stored fingerprint pattern associated with the user 204. In another example, one or more of the authenticators 222 may compare an iris pattern of the user 204 captured by a camera supported by the I/O interface 218 with a stored iris pattern associated with the user 204. In another example, one or more of the authenticators 222 may compare a facial pattern of the user 204 captured by the camera supported by the I/O interface 218 with a stored facial pattern associated with the user 204.

In another example, one or more of the authenticators 222 may be based on One Time Password (OTP) authentication in which a dynamic password and/or part thereof which is valid for a predefined short period of time (e.g. seconds, minutes) may be provided to the user 204 via a device associated with the user 204, for example, the client device 202 and/or another client device. For example, response to an authentication request, one or more of the authenticators 222 may transmit an OTP password to a client device registered and associated in the records with the user 204. The user 204 may be then authenticated based on the transmitted OTP and/or part thereof optionally in combination with another piece of information (for example, a static password and/or a derivative of such a password) provided by the user via the I/O interface 218, for example, the keyboard, the touchscreen, the camera and/or the like.

The processor(s) 214 may further execute one or more authentication management software module, specifically a local authentication manager 220A to execute the process 100 for enhancing the authentication session to increase confidence in the genuine identity of the user 204.

Optionally, for the execution of the local secure resources 206A, the authenticators 222 and/or the local authentication manager 220A, the processor(s) 214 may further utilize one or more hardware elements which may be integrated in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The I/O interface 218 may include one or more user interfaces, i.e. Human Machine Interfaces (HMI) for interacting with the user 204, for example, a keyboard, a touchpad, a pointing device, a touchscreen, a display, a speaker, an earphone, a microphone and/or the like. The user interface 218 may optionally include one or more biometric sensors and/or devices, for example, a tactile senor (for fingerprint verification), an imaging sensor (for iris and/or face recognition, etc.), a microphone (for voice recognition) and/or the like. The I/O interface 218 may also include one or more imaging sensors, for example, a camera, a scanner and/or the like for scanning one or more machine readable representations, for example, a barcode, a QR code and/or the like. The I/O interface 218 may further include one or more audio input and/or output interfaces configured to capture and/or generate respectively audible data, i.e. voice, speech, sound and/or the like.

The client device 202 may further include a network interface 212 comprising one or more wired and/or wireless network interfaces for connecting to the network 208, for example, a LAN interface, a WLAN interface, a WAN interface, a MAN interface, a cellular interface and/or the like. Via the network interface 212, the client device 202 may access the remote secure resource(s) 206B and/or communicate with the remote authentication system 210 if used for the authentication session.

The remote authentication system 210 may comprise a network interface 232 such as the network interface 212, a processor(s) 234 such as the processor(s) 214 for executing the authentication process 100 and/or part thereof for authenticating the user 204 and a storage 236 for storing data and/or code (program store).

The network interface 232 may include one or more of the wired and/or wireless network interfaces to enable network access for the remote authentication system 210 to the network 208, to communicate with the remote secure resources(s) 206B and/or the client device 202.

The processor(s) 234, homogenous or heterogeneous, may include one or more processing nodes arranged for parallel processing, as clusters and/or as one or more multi core processor(s). The storage 236 may include one or more non-transitory persistent storage devices, for example, a Read Only Memory (ROM), a Flash array, a hard drive and/or the like. The storage 216 may also include one or more volatile devices, for example, a Random Access Memory (RAM) component, a cache and/or the like. The storage 236 may further comprise one or more network storage devices, for example, a storage server, a Network Accessible Storage (NAS), a network drive and/or the like accessible through the network interface 202.

The processor(s) 234 may execute one or more software modules each comprising a plurality of program instructions stored in a non-transitory medium (program store) such as the storage 236 and executed by one or more processors such as the processor(s) 234. For example, the processor(s) 234 may execute a remote authentication manager 220B to conduct the authentication process 100 and/or part thereof.

Optionally, the remote authentication system 210 is integrated with one or more of the remote secure resources 206B such that the processor(s) 234 may execute one or more software modules to provide the respective remote secure resources 206B.

Optionally, for execution of the remote secure resource(s) 206B (if applicable) and/or the remote authentication manager 220B, the processor(s) 234 may further utilize one or more hardware elements which may be integrated in the remote authentication system 210, for example, a circuit, a component, an IC, an ASIC, an FPGA, a DSP, a GPU, a network processor and/or the like.

Optionally, the remote authentication system 210, specifically the remote authentication manager 220B executed by the remote authentication system 210 is implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The process 100 and the system 200 describe a single user 204 using a single associated client device 202 for accessing the secure resource(s) 206. This, however, should not be construed as limiting since the process 100 as described for the system 200 may be expanded to serve and authenticate a plurality of users such as the user 204 each using one or more client devices such as the client device 202 for accessing one or more of the secure resources 206.

The authentication process 100 may be conducted by the local authentication manager 220A, by the remote authentication manager 220B and/or by a combination thereof. In case the authentication process 100 is conducted at least partially by the remote authentication manager 220B, the remote authentication manager 220B may communicate with a local application executed by the client device 202, for example, the local authentication manager 220A to exchange data with the client device 202 and control the authentication session locally conducted by the client device 202 with the user 204. In particular, the remote authentication manager 220B may instruct the local authentication manager 220A to collect data at the client device 202 for and/or during the authentications session, for example, data provide by the user 204, data collected for the user 204, data indicative of the environment of the user 204 and/or the client device 202, sensory data captured by one or more sensors and/or interfaces of the client device 202, data stored at the client device 202 and/or the like. The remote authentication manager 220B may further instruct the local authentication manager 220A to present to the user 204 data transferred from the remote authentication manager 220B.

Execution of the authentication session may be therefore distributed between the local authentication manager 220A and the remote authentication manager 220B or alternatively conducted entirely by the local authentication manager 220A. For brevity, the local authentication manager 220A, the remote authentication manager 220B and/or any combination thereof are therefore designated hereinafter as the authentication manager 220.

As shown at 102, the process 100 starts with the authentication manager 220 receiving an authentication request to authenticate the user 204 using the client device 202 to access one or more of the secure resources 206, either local secure resources 206A and/or remote secure resources 206B.

As shown at 104, the authentication manager 220 initiates an authentication session to authenticate the user 204 in order to verify his identity and privileges to access the requested secure resource(s) 206 and determine accordingly whether the user 204 may be granted or denied access to the secure resource(s) 206.

As shown at 106, the authentication manager 220 may identify one or more contextual authentication attributes which may be indicative of a risk level of a compromised authentication session and/or alternatively of a confidence level of a genuine authentication session. The contextual authentication attributes may relate to the authentication session and/or one or more aspects of the authentication session, for example, the user 204, the client device 202, the available authenticators 222 and/or the like.

The contextual authentication attributes relating to the user 204 may be derived from analysis of historical authentication information related to and/or collected during one or more previous authentication sessions conducted for the user 204. The historical authentication information may be locally stored in the client device 202 and/or stored in one or more remote storage resources and/or services, for example, a server, a cloud service, the remote authentication system 210 and/or the like accessible to the authentication manager 220 via the network 208. Such contextual authentication attributes may reflect risk, probability and/or concern that the user 204 may be an imposter impersonating as a legitimate user 204 in attempt to access the secure resource(s) for potentially malicious purposes. These user contextual authentication attributes may relate to, for example, failure/success in previous authentication sessions, typical access and/or authentication patterns identified for the user 204 accessing the secure resource(s) 206 in the previous authentication session(s) and/or the like.

The contextual authentication attributes relating to the client device 202 may include, for example, a type of the client device 202, association of the client device 202 with the user 204, one or more operational parameters of the client device 202 and/or the like. The authentication manager 220 may identify and/or analyze one or more of these contextual authentication attributes and may assign a respective risk score accordingly. The authentication manager 220 may communicate with one or more applications, services and/or utilities executed by the client device 202 and/or one or more remote resources to retrieve the contextual authentication attributes relating to the client device 202 from one or more records locally stored in the client device 202 and/or in one or more of the remote storage resources.

The authentication manager 220 may further define an identity confidence threshold required for the secure resource(s) 206 requested (accessed) by the user 204 according to one or more attributes predefined for the secure resource(s) 206 to reflect the criticality of the secure resource(s) and/or the potential damage which may result from breach of the secure resource(s) 206. Such attributes may include, for example, a type of the secure resource 206, a sensitivity level predefined for the secure resource 206, a security level predefined for the secure resource 206, a privacy level predefined for the secure resource 206 and/or the like. The threshold defined for the secure resource(s) may thus translate to the number of authentication iterations required for the authentication manager 220 to accumulate sufficient confidence in the identity of the user 204.

The identity confidence threshold may be therefore defined individually for one or more of the secure resources 206 such that each secure resource 206 may be assigned a certain threshold reflecting the confidence in the identity of the user 204 required for granting the user 204 access to the respective secure resource 206. As such, highly secure resources 206 may be predefined with a significantly high threshold while lower secure resources 206 may be predefined with a lower threshold.

The authentication manager 220 may communicate with one or more applications, services and/or utilities executed by the client device 202, the secure resource(s) 206 and/or one or more remote networked resources via the network 208 to retrieve the attributes of the secure resource(s) 206 which may be stored locally in the client device 202, in the secure resource(s) 206 and/or in one or more remote storage resources.

As shown at 108, the authentication manager 220 may select one of the plurality of authenticators 222 based on analysis of one or more of the contextual authentication attributes identified for the (current) authentication session, in particular for the attributes relating to the secure resource(s) 206 and may initiate the selected authenticator 222.

For example, the authentication manager 220 may identify a significantly high sensitivity level predefined for a highly sensitive secure resource 206, for example, an enterprise secure resource (e.g. company database, enterprise service, etc.) compared to the sensitivity level predefined for a private secure resource 206, for example, a secure resource used by a single user, for example, a secure login to the client device 202. In another example, the authentication manager 220 may identify a significantly high security level predefined for a highly secure resource 206, for example, a financial secure resource (e.g. an online bank account, an online payment system, etc.) compared to the security level predefined for a lesser secure resource 206, for example, an online gaming platform. In another example, the authentication manager 220 may identify a significantly high privacy level predefined for a private secure resource 206, for example, a social network, a cloud photographs storage service, a home surveillance system, a home camera and/or the like compared to the privacy level predefined for a public secure resource 206, for example, an online magazine subscription.

Based on analysis of the attribute(s) identified for the secure resource(s) 206 that the user 204 requests to access, the authentication manager 220 may compute a risk score for the secure resource(s) 206. Moreover, the authentication manager 220 may compute an aggregated risk score aggregating multiple attributes of the secure resource(s) 206, for example, the sensitivity level, the security level and/or the privacy level.

The authentication manager 220 may then select one or more of the authenticators 222 and may initiate them for authenticating the use 204. Naturally, the authentication manager 220 selects authenticators 222, which are available and supported by the client device 202. For example, one or more biometric authenticators 222 may be deployed on client devices 202 having one or more biometric sensors, such as, for example, a camera, a fingerprint scanner and/or the like. In another example, one or more OTP based authenticators 222 may be deployed on client devices 202 having network connectivity, for example, cellular network connectivity, internet network connectivity and/or the like.

Moreover, the authentication manager 220 may define the authentication session to be an iterative process comprising a plurality of iterations where in each of the iterations a respective (different) one of the plurality of authenticators 222 is initiated for authenticating the user 204. The authentication manager 220 may define a maximum number of iterations, the type of the authenticators 222 used in each iteration and/or an order of initiation of the authenticators 222 during the authentication session.

Optionally, one or more of the authenticators 222 to be used in the authentication session are selected by the user 204 himself.

The authentication manager 220 may dynamically control and/or adjust the authentication session in real-time to balance between the burden laid on the user 204, i.e. the effort required from the user 204 for authenticating himself and a confidence level required for verifying the identity of the user 204 with a sufficient degree of confidence. The burden laid on the user 204 for authenticating himself relates to the degree to which the authentication session is tedious, time consuming and/or the like for the user 204. The sufficient degree of confidence is determined by the authentication manager 220 based the risk score and/or the concern level computed for the user 204 based on the contextual authentication attribute(s) identified for and/or during the authentication session.

The authentication manager 220 may dynamically control the authentication session in real-time by selecting the authenticators 222 and/or by defining the identity confidence threshold for the secure resource(s) requested by the user 260, which may translate to the number of authentication iterations required in the authentication session to reach the identity confidence threshold. Applying the iterative authentication session, the authentication manager 220 may thus accumulate confidence in the identity of the user 204 through the plurality of authenticators 222 until reaching or exceeding the identity confidence threshold defined for the secure resource(s) 206.

For example, assuming the aggregated risk score computed based on the attribute(s) identified for the secure resource(s) 206 is high indicating there is major concern of compromising the requested secure resource(s) 206. In such case, the authentication manager 220 may select one or more authenticators 222, which may require major effort from the user 204 to authenticate himself but on the other hand may significantly increase the confidence that the user 204 is indeed who he claims to be. However, in case the aggregated risk score computed based on the attribute(s) identified for the secure resource(s) 206 is relatively low, the authentication manager 220 may select one or more authenticators 222, which require relatively low and/or minimal effort from the user 204 to authenticate himself.

High effort authenticators 222 may include, for example, a password based authenticator 222 requiring the user 204 to insert a long password, an OTP based authenticator 222 requiring the user 204 to communicate with a remote authentication system such as the remote authentication system 210 to receive an OTP and insert it to the client device 202 and/or the like. Low user effort authenticators 222 on the other hand may include, for example, a biometric authenticator 222 based on fingerprint scanning of the finger of the user 204, a password based authenticator 222 requiring the user 204 to insert a short code (string) (e.g. 4-digits code, etc.) and/or the like.

Moreover, for high risk secure resource(s) 206, the authentication manager 220 may further define a high identity confidence threshold which may translate to a relatively high number of authentication iterations, i.e. the number of different authenticators 222 used in the authentications session, for example, 3, 4 iterations or more to accumulate authenticators 222 and hence accumulate their respective scores to reach the high threshold. For lower risk secure resource(s) 206, the authentication manager 220 may define a lower identity confidence threshold which may translate to a relatively low number of authentication iterations, 1 or 2 iterations which may reduce the authentication burden from the user 204 but may be less reliable with respect to ensuring the user 204 is a legitimate and genuine user.

As shown at 110, which is a conditional step, in case the user 204 successfully authenticates himself using the authenticator 222 selected by the authentication manager 220 for the current iteration, the process 100 branches to 112. However, in case the authentication of the user 204 fails, the authentication session is aborted and the process 100 branches to 124. Optionally, in case of failures, the authentication manager 220 may ignore the failed authentication iteration and may branch to 120 in order to initiate another authentication iteration.

As shown at 112, in case of successful authentication of the user 204 using the authenticator 222 selected for the current iteration, the authentication manager 220 computes an identity confidence score for the user 204.

For example, the identity confidence score may be predefined for each of one or more of the authenticators 222 and stored in one or more records, for example, a list, a table, a database and/or the like accessible to the authentication manager 220 which may thus retrieve the identity confidence score of the selected authenticator 222. For example, a certain password based authenticator 222 may be assigned a predefined identity confidence score of 100, a certain security question based authenticator 222 may be assigned a predefined identity confidence score of 100, a certain OTP based authenticator 222 may be assigned a predefined identity confidence score of 150, a certain fingerprint biometric authenticator 222 may be assigned a predefined identity confidence score of 200 and a certain soft token authenticator 222 may be assigned a predefined identity confidence score of 180.

As shown at 114, the authentication manager 220 may adjust the identity confidence score computed in the current iteration according to one or more of the contextual authentication attributes identified for the authentication session and/or the current authentication iteration. The authentication manager 220 may further apply one or more scoring rules to adjust the computed identity confidence score according to the identified contextual authentication attribute(s). One or more of these scoring rules may be predefined by one or more users, for example, an expert, an administrator, an operator and/or the like. Optionally, the authentication manager 220 may automatically define, adjust and/or update one or more of the scoring rules according to analysis of a plurality of authentication sessions conducted for a plurality of users such as the user 204 requesting to access the secure resources 206.

For example, the authentication manager 220 may identify and/or analyze one or more of this contextual authentication attributes according to one or more of the scoring rules, compute a risk score and may adjust the identity confidence score according to the risk score. The authentication manager 220 may further compute an aggregated risk score aggregating the risk score computed based on a plurality of identified contextual authentication attributes and may adjust the identity confidence score accordingly.

For example, the authentication manager 220 may assign a high-risk score to the user 204 in case the user 204 failed to successfully authenticate in one or more previous authentication sessions. The authentication manager 220 may further increase the risk score to the user 204 in case the user 204 failed to authenticate in one or more previous authentication sessions using the authenticator used in the current authentication iteration. In contrast, the authentication manager 220 may assign a relatively low risk score to the user 204 in case the user 204 successfully authenticated himself in one or more previous authentication sessions.

In another example, assuming that based on analysis of the historical authentication information, the authentication manager 220 identifies that the user 204 typically uses a certain authenticator 222, for example, a biometric authenticator for accessing the secure resource 206. The authentication manager 220 may therefore assign a relatively low risk score to the user 204 in case the user 204 requests to apply the biometric authenticator for the current authentication session. In contrast, the authentication manager 220 may assign a high-risk score to the user 204 in case the user requests to apply an OTP authenticator in the current authentication session.

In another example, assuming that based on analysis of the historical authentication information, the authentication manager 220 identifies that the user 204 typically accesses the requested secure resource(s) 206 at certain times of the day, for example, securely logging into the client device 202 in the morning between 8:00 AM and 10:00 AM. The authentication manager 220 having access to the current time may therefore assign a relatively low risk score to the user 204 in case the current authentication session is initiated for the user 204 during typical access hours of 8:00-10:00 AM. In contrast, the authentication manager 220 may assign a relatively high-risk score to the user 204 in case the current authentication session is initiated for the user 204 at non-typical times, for example, 2:00 AM, 7:00 PM and/or the like.

In another example, assuming that based on analysis of the historical authentication information, the authentication manager 220 identifies that the user 204 typically accesses the secure resource 206 when located at a certain geographical location, for example his office, his home and/or the like. The authentication manager 220 having access to the current location of the user 204 and/or his associated client device 202 (e.g. from a positioning and/or location sensor of the client device 202) may therefore assign a risk score to the user 204 according to a current geolocation of the user 204 and/or the associated client device 202. For example, the authentication manager 220 may assign a relatively low risk score to the user 204 in case the user 204 and/or the associated client device 202 are identified in one of the typical geolocations during the current authentication session. In contrast, the authentication manager 220 may assign a high risk score to the user 204 in case the in case the geolocation of the user 204 and/or the associated client device 202 are identified to be in a non-typical geolocation, for example, another city, another country and/or the like.

In another example, based on the identified type of the client device 202, the authentication manager 220 may assign a relatively high-risk score to a client device 202 having limited anti-malware protection, for example, a low-end device having limited computing resources (e.g. processing resources, storage resources, encryption engines, etc.). However, the authentication manager 220 may assign a relatively low risk score to the client device 202 in case the client device 202 includes extensive anti-malware protections, for example, a high end laptop installed with updated anti-malware software.

In another example, based on the identified association of the client device 202 with the user 204, the authentication manager 220 may assign a relatively high risk score to a client device 202 used by a plurality of users, for example, a terminal in a coffee shop. In contrast, the authentication manager 220 may assign a relatively low risk score to the client device 202 in case the client device 202 is privately owned by the user 204, for example, a Smartphone, a laptop computer and/or the like.

In another example, the authentication manager 220 may assign the risk score based on one or more of the operational parameters of a cellular client device 202 (e.g. a Smartphone, a tablet, etc.), for example, its Subscriber Identity Module (SIM) card. The authentication manager 220 may assign a high-risk score to the cellular client device 202 in case its SIM card was recently replaced and never or nearly never used before for authenticating the user 204. On the other hand, the authentication manager 220 may assign a relatively low risk score to the cellular client device 202 in case its SIM card was used for authenticating the user 204 in multiple previous authentication sessions.

As described herein before, the contextual authentication attributes identified for the authentication session may further relate to one or more of the authenticators available and/or used during the authentication session 100.

The contextual authentication attributes relating to the authenticators 222 may include, for example, historical information collected for one or more of the authenticators 222, activity information documenting past interaction of the user 204 with one or more of the authenticators 222, one or more operational parameters of one or more of the authenticators 222 and/or the like. The authentication manager 220 may identify and/or analyze one or more of these contextual authentication attributes and may assign a respective risk score accordingly. The authentication manager 220 may communicate with one or more applications, services and/or utilities executed by the client device 202 and/or one or more remote resources to retrieve the contextual authentication attributes relating to authenticators 222 from one or more records locally stored in the client device 202 and/or in one or more of the remote storage resources.

For example, the authentication manager 220 may assign a relatively high risk score to a certain authenticator 222, for example, a password based authenticator 222 based on one or more of its operational parameters, for example, a most recent password reset event and/or the like. The authentication manager 220 may assign a relatively high risk score to the password based authenticator 222 in case the password was recently reset, for example, within the past 24 hours, 48 hours, 72 hours and/or the like which may be indicative of a potential password hacking attempt. However, the authentication manager 220 may assign a relatively low risk score to the client device 202 in case the password based authenticator 222 was not very recently reset, for example, at least a week ago and/or the like which may be indicative of normal and typical password maintenance behavior on part of the user 204. However, the authentication manager 220 may assign a higher risk score to the password based authenticator 222 in case the password was not reset recently enough, for example, within the past 6 months, within the past year and/or the like which may expose the password to potential leak and discovery by malicious parties.

In another example, the authentication manager 220 may assign the risk score to a certain authenticator 222, for example, a biometric authenticator 222 such as, for example, a face recognition authenticator 222 based on one or more of its operational parameters, for example, the camera of the client device 202 used by the face recognition authenticator 222 to identify and authenticate the face of the user 204. In such case, the authentication manager 220 may assign a relatively high-risk score to a face recognition authenticator 222, which uses a low-resolution camera of the client device 202. In contrast, the authentication manager 220 may assign a relatively low risk score to a face recognition authenticator 222, which uses a high-resolution camera of the client device 202. In another example, the authentication manager 220 may assign a relatively high-risk score to the face recognition authenticator 222 using the camera of the client device 202 to identify and authenticate the user 204 in a low illumination environment. In contrast, the authentication manager 220 may assign a relatively low risk score to a face recognition authenticator 222 the camera of the client device 202 to identify and authenticate the user 204 in a high illumination environment.

In another example, the authentication manager 220 may assign the risk score to a certain authenticator 222, for example, an OTP based authenticator 222 based on it(s) operational parameters, for example, the communication medium used to deliver the OTP to the client device 202. For example, the authentication manager 220 may assign a relatively high-risk score to an OTP authenticator 222 using cellular communication facilitated by a cellular client device 202, which had its SIM card very recently replaced, which may be indicative of a potential compromise of the client device 202. In another example, the authentication manager 220 may assign a low risk score to an OTP authenticator 222 using communication protocols directed to an Ethernet interface of the client device 202 based on an Internet Address (IP) and/or Media Access Controller (MAC) address uniquely assigned to the client device 202, which may not be easily compromised.

In another example, the authentication manager 220 may assign the risk score to a certain authenticator 222, for example, a key-based authenticator 222 based on one or more of its operational parameters, for example, complexity of the key and/or code used by the key-based authenticator 222. For example, the authentication manager 220 may assign a relatively high-risk score to a key-based authenticator 222 requiring a simple key (e.g. 4-digits code) which may be exposed and/or cracked relatively easy by malicious parties. In another example, the authentication manager 220 may assign a relatively low risk score to a key based authenticator 222 requiring a complex key, for example, a 256-bit code encrypted in a QR code in possession of the user 204, which may be significantly difficult for the malicious party to acquire and/or compromise.

In another example, the authentication manager 220 may estimate the risk for one or more authenticator 222 based on the historical information collected for the respective authenticators 222, for example, authenticators 222 typically used by the user 204 to authenticate for accessing the secure resource(s) 206. The authentication manager 220 may assign a high risk score to a first authenticator 222 not typically used by the user 204 since it may indicate that the user 204 may in fact be a potential imposter impersonating as the legitimate user 204. However, the authentication manager 220 may assign a relatively low risk score to a second authenticator 222 typically used by the user 204.

The authentication manager 220 may then adjust the respective identity confidence score computed in the current iteration to reflect the computed risk score. The authentication manager 220 may further aggregate the respective risk scores computed for a plurality of the contextual authentication attributes identified during the current authentication iterations to produce an aggregated risk score which may be applied by the authentication manager 220 to adjust the identity confidence score accordingly.

Continuing the previous examples, in which the certain password based authenticator 222 has predefined identity confidence score of 100, the certain security question based authenticator 222 has predefined identity confidence score of 100, the certain OTP based authenticator 222 has predefined identity confidence score of 150, the certain fingerprint biometric authenticator 222 has predefined identity confidence score of 200 and the certain soft token authenticator 222 has predefined identity confidence score of 180.

For example, assuming that the certain password based authenticator 222 is used in the current iteration and further assuming that the password for this certain password-based authenticator 222 was recently reset, for example, one day ago. In such case, based on the risk score computed for the certain password-based authenticator 222, the authentication manager 220 may deduct a value of 20 from the certain password-based authenticator 222 predefined identity confidence score of 100. The adjusted identity confidence score computed by the authentication manager 220 for the certain password-based authenticator 222 may be thus 80.

In another example, assuming that the certain OTP based authenticator 222 is used in the current iteration and further assuming that the SIM of the client device 202 being a cellular client device was recently replaced, for example, 1 hour ago. In such case, based on the risk score computed for the certain OTP based authenticator 222, the authentication manager 220 may deduct a value of 20 from the certain password based authenticator 222 predefined identity confidence score of 150. The adjusted identity confidence score computed by the authentication manager 220 for the certain OTP based authenticator 222 may be thus 130.

In another example, assuming that the certain fingerprint biometric authenticator 222 is used in the current iteration and further assuming that a reference fingerprint pattern was recently enrolled (inserted), for example, within the past 24 hours. In such case, based on the risk score computed for the certain fingerprint biometric authenticator 222, the authentication manager 220 may deduct a value of 25 from the fingerprint biometric authenticator 222 predefined identity confidence score of 200. The adjusted identity confidence score computed by the authentication manager 220 for the certain fingerprint biometric authenticator 222 may be thus 175.

In another example, assuming that the certain fingerprint biometric authenticator 222 is used in the current iteration and further assuming that the reference fingerprint pattern was not recently enrolled, for example, over 30 days ago and was used since in five successful authentication sessions of the user 204. In such case, based on the risk score computed for the certain fingerprint biometric authenticator 222, the authentication manager 220 may add a value of 50 to the fingerprint biometric authenticator 222 predefined identity confidence score of 200. The adjusted identity confidence score computed by the authentication manager 220 for the certain fingerprint biometric authenticator 222 may be thus 250.

Optionally, each of the contextual authentication attributes is assigned a weight indicating its contribution to the risk estimation. As such, contextual authentication attributes indicative of high risk may be assigned higher weights while contextual authentication attributes indicative of low risk may be assigned lower weights. The authentication manager 220 may apply the weights defined for the identified contextual authentication attributes to adjust the identity confidence score accordingly. For example, the authentication manager 220 may multiply the risk score computed based on each of the contextual authentication attributes by the weight defined for the respective contextual authentication attribute and use the outcome for computing the aggregated risk score from which the identity confidence score is derived (computed).

As shown at 116, the authentication manager 220 may update a cumulative identity confidence score accumulated during one or more previous authentication iterations. In case the current authentication iteration is the first iteration, the authentication manager 220 may set the adjusted identity confidence score computed for the current authentication iteration as the initial value for the cumulative identity confidence score.

Moreover, the authentication manager 220 may further adjust the cumulative identity confidence score according to one or more scoring rules defining a mutual scoring relation between a plurality of authentication methods 222 initiated during a plurality of authentication iterations of the current authentication session. This means that the authentication manager 220 may adjust the cumulative identity confidence score adjusted following multiple iterations to compensate for mutual independence between the authenticators 222 initiated and used for authenticating the user 204 in at least some of these iterations.

For example, assuming that the certain OTP based authenticator 222 was used in a previous iteration and the certain fingerprint biometric authenticator 222 is used in the current iteration. Both the OTP based authenticator 222 and the fingerprint biometric authenticator 222 are directed to verify something the user 204 has, specifically, the OTP based authenticator 222 is based on verifying the client device 202 of the user 204 and the fingerprint biometric authenticator 222 is based on based on verifying the fingerprint of the user 204 to unlock information stored on the client device 202. In such case, the authentication manager 220 may adjust, specifically reduce the value of the cumulative identity confidence score, for example, deduct a value of 30 from the cumulative identity confidence score.

In another example, assuming that the certain password-based authenticator 222 was used in a previous iteration and the certain security question based authenticator 222 is used in the current iteration. Both the password based authenticator 222 and the security question based authenticator 222 are directed to verify something the user 204 knows, i.e. the password and the answer to the security question. In such case, the authentication manager 220 may adjust, specifically reduce the value of the cumulative identity confidence score, for example, deduct a value of 50 from the cumulative identity confidence score.

As shown at 118, which is a conditional step, the authentication manager 220 compares between the cumulative identity score updated during the current iteration and the identity confidence threshold predefined for the secure resource(s) 206 requested by the user 204. In case the cumulative identity score exceeds the threshold, the process 100 branches to 122. In case the cumulative identity score does not exceed the threshold (i.e. the cumulative identity score is lower than the threshold) the process 100 branches to 120.

As shown at 120, which is another conditional step, in case the maximum number of authentication iteration defined at the beginning of the authentication session as described in step 108 is reached, the process 100 branches to 124. However, in case the maximum number of authentication iteration is not reached, the authentication session may continue and the process 100 branches to step 106 to initiate another authentication iteration.

To continue the previously presented examples, assuming the current authentication iteration is the second iteration in which the user is (successfully) authenticated using the certain fingerprint biometric authenticator 222 while in the first iteration the certain OTP based authenticator 222 was used to (successfully) authenticate the user 204. Further assuming that in the first iteration, the authentication manager 220 adjusted the respective identity confidence score from 100 to 70 because the fingerprint pattern was only recently (e.g. within the past 24 hours) enrolled. Further assuming that in the current (second) iteration, the authentication manager 220 adjusted the respective identity confidence score to from 150 to 130 because the SIM of the client device was recently replaced. The updated cumulative identity confidence score may be therefore a sum of the respective identity confidence scores computed in each of the two iterations, i.e. 200. However, as described herein before, due to the interdependence between the certain fingerprint biometric authenticator 222 and the certain OTP based authenticator 222, the authentication manager 220 adjusted the cumulative identity confidence score by deducting 30 thus the adjusted cumulative identity confidence score is 170. Assuming the threshold predefined for the requested secure resource 206 is 150, the authentication manager 220 may determine that the adjusted cumulative identity confidence score (170) exceeds the predefined threshold (150) and may branch to 122. However, in case the threshold predefined for the requested secure resource 206 is 200, the authentication manager 220 may determine that the adjusted cumulative identity confidence score (170) does not exceed the predefined threshold (200) and may initiate another iteration in case the maximal number of iterations is not reached (i.e. >2) or branch to 124 in case the maximal number of iterations is reached (i.e. =2).

As shown at 122, the authentication manager 220 determines that the authentication session was successful and the identity of the user 204 could be authenticated with a high level of confidence. The authentication manager 220 may output a successful authentication session indication, which may be used to grant the user 204 access to the requested secure resource(s) 206.

As shown at 124, the authentication manager 220 determines that the authentication session failed and the identity of the user 204 could not be authenticated with a sufficiently high level of confidence. The authentication manager 220 may output an authentication session failure indication, which may be used to deny the user 204 access to the requested secure resource(s) 206.

It is expected that during the life of a patent maturing from this application many relevant systems, methods and computer programs will be developed and the scope of the terms client device and authentication methods are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first, indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean, "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of estimating an identity confidence level for a user requesting access to a secure resource based on contextual information, comprising:
   initiating an authentication session in response to an authentication request for authenticating the user using a client device to access the secure resource;
   computing a cumulative identity confidence score iteratively accumulated in at least one iteration, wherein each of the at least one iteration comprising:
   identifying automatically at least one of a plurality of contextual authentication attributes for the authentication session,
   initiating a respective one of a plurality of authentication methods selected according to the at least one of the plurality of contextual authentication attributes,
   computing a respective identity confidence score for the user in case of successful authentication using the respective one of the plurality of authentication methods, wherein said respective identity confidence score is determined based on the respective one of the plurality of authentication methods initiated in a current iteration,
   adjusting the respective identity confidence score according to the at least one of the plurality of contextual authentication attributes,
   updating the cumulative identity confidence score by accumulating the respective adjusted identity confidence score to said cumulative identity confidence score calculated in a previous iteration, and
   initiating a next iteration of the at least one iteration, in case the cumulative identity confidence score does not exceed a threshold predefined for the secure resource; and
   outputting a successful authentication indication in case the cumulative identity confidence score exceeds the predefined threshold.

2. The computer implemented method of claim 1, further comprising adjusting the cumulative identity confidence score according to at least one scoring rule defining a mutual scoring relation between at least some of the authentication methods initiated in the authentication session.

3. The computer implemented method of claim 1, further comprising adjusting the identity confidence score according to a weight predefined for at least one of the plurality of contextual authentication attributes.

4. The computer implemented method of claim 1, wherein the authentication session is conducted by a local authentication system deployed in the client device.

5. The computer implemented method of claim 1, wherein the authentication session is conducted at least partially by a remote authentication system accessible to the client device via at least one network.

6. The computer implemented method of claim 1, wherein the plurality of authentication methods comprising at least some of a group consisting of: a static password based authentication, a One Time Password (OTP) based authentication, a biometric based authentication and a proof of possession based authentication.

7. The computer implemented method of claim 1, wherein the plurality of contextual authentication attributes relate to at least one of: the user, the client device and the respective one of the plurality of authentication methods.

8. The computer implemented method of claim 7, wherein the at least one contextual authentication attribute relating to the user is derived from historical authentication information collected during at least one previous authentication session conducted for the user.

9. The computer implemented method of claim 8, wherein the at least one contextual authentication attribute derived from the historical authentication information comprises at least of: at least one access pattern of the user to the secure resource, success of at least one previous authentication session and failure of at least one previous authentication session, the at least one access pattern relating to at least one of: an access timing and an access geolocation.

10. The computer implemented method of claim 7, wherein the at least one contextual authentication attribute relating to the client device includes at least one member of a group consisting of: a type of the client device, association of the client device with the user and at least one operational parameter of the client device.

11. The computer implemented method of claim 7, wherein the at least one contextual authentication attribute relating to the at least one authentication method includes at least one of: historical information collected for the at least one authentication method, activity information documenting past interaction of the user with the at least one authentication method and at least one operational parameter of the at least one authentication method.

12. The computer implemented method of claim 1, wherein the threshold of the secure resource is defined according to at least one attribute relating to the secure resource which reflects at least one of: a criticality of the secure resource and a potential damage resulting from breach of the secure resource and includes at least one member of a group consisting of: a type of the secure resource, a sensitivity level predefined for the secure resource, a security level predefined for the secure resource and a privacy level predefined for the secure resource.

13. An authentication system for estimating an identity confidence level for a user requesting access to a secure resource based on contextual information, comprising:
a program store storing a code; and
at least one processor of an authentication system coupled to the program store for executing the stored code, the code comprising:
code instructions to initiate an authentication session in response to an authentication request for authenticating the user using a client device to access the secure resource;
code instructions to compute a cumulative identity confidence score iteratively accumulated in at least one iteration, wherein each the at least one iteration comprising:
identifying automatically at least one of a plurality of contextual authentication attributes for the authentication session,
initiating a respective one of a plurality of authentication methods selected according to the at least one of the plurality of contextual authentication attributes,
computing a respective identity confidence score for the user in case of successful authentication using the respective one of the plurality of authentication methods, wherein said respective identity confidence score is determined based on the respective one of the plurality of authentication methods initiated in a current iteration,
adjusting the respective identity confidence score according to the at least one of the plurality of contextual authentication attributes,
updating the cumulative identity confidence score by accumulating the respective adjusted identity confidence score to said cumulative identity confidence score calculated in a previous iteration, and
initiating a next iteration of the at least one iteration, in case the cumulative identity confidence score does not exceed a threshold predefined for the secure resource; and
code instructions to output a successful authentication indication in case the cumulative identity confidence score exceeds the predefined threshold.

14. A computer program product for estimating an identity confidence level for a user requesting access to a secure resource based on contextual information, comprising:
a non-transitory computer readable storage medium;
first program instructions for initiating an authentication session in response to an authentication request for authenticating the user using a client device to access the secure resource;
second program instructions for computing a cumulative identity confidence score iteratively accumulated in at least one iteration, wherein each of the at least one iteration comprising:
identifying automatically at least one of a plurality of contextual authentication attributes for the authentication session,
initiating a respective one of a plurality of authentication methods selected according to the at least one of the plurality of contextual authentication attributes,
computing a respective identity confidence score for the user in case of successful authentication using the respective one of the plurality of authentication methods, wherein said respective identity confidence score is determined based on the respective one of the plurality of authentication methods initiated in a current iteration,
adjusting the respective identity confidence score according to the at least one of the plurality of contextual authentication attributes,
updating the cumulative identity confidence score by accumulating the respective adjusted identity confidence score to said cumulative identity confidence score calculated in a previous iteration, and
initiating a next iteration of the at least one iteration, in case the cumulative identity confidence score does not exceed a threshold predefined for the secure resource; and
third program instructions for outputting a successful authentication indication in case the cumulative identity confidence score exceeds the predefined threshold;
wherein the first, second and third program instructions are executed by at least one processor of an authentication system from the non-transitory computer readable storage medium.

15. The computer implemented method of claim 1, wherein said next iteration is not initiated in case a number of iterations reaches a predefined maximum number.

16. The computer implemented method of claim 1, wherein said authentication session is dynamically adjusted in real time by balancing between a burdens laid on the user in performing said at least one iteration and a confidence level required for verifying the identity of the user with a sufficient degree of confidence.

* * * * *